(12) United States Patent
Buchstab et al.

(10) Patent No.: US 8,038,873 B2
(45) Date of Patent: Oct. 18, 2011

(54) REFRIGERATION DEVICE COMPRISING A WATER FILTER

(75) Inventors: Martin Buchstab, Bopfingen (DE); Hans Ihle, Giengen (DE); Andreas Kempte, Zschopau (DE); Peter Nalbach, Kirchheim/Nabern (DE); Michael Roth, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 706 days.

(21) Appl. No.: 12/085,932

(22) PCT Filed: Oct. 16, 2006

(86) PCT No.: PCT/EP2006/067431
§ 371 (c)(1),
(2), (4) Date: May 28, 2008

(87) PCT Pub. No.: WO2007/062904
PCT Pub. Date: Jun. 7, 2007

(65) Prior Publication Data
US 2009/0293528 A1    Dec. 3, 2009

(30) Foreign Application Priority Data
Nov. 30, 2005  (DE) .......................... 10 2005 057 132

(51) Int. Cl.
*F25D 17/02* (2006.01)
(52) U.S. Cl. ........................................... 210/87; 62/318
(58) Field of Classification Search .................... 210/87, 210/85, 110, 116; 62/338
See application file for complete search history.

(56) References Cited

U.S. PATENT DOCUMENTS

| | | | |
|---|---|---|---|
| 3,430,100 A * | 2/1969 | Dill, Jr. ............................ 315/78 |
| 5,560,393 A | 10/1996 | Clack | |
| 6,182,453 B1 | 2/2001 | Forsberg | |
| 6,355,177 B2 | 3/2002 | Senner et al. | |
| 6,375,834 B1 | 4/2002 | Guess et al. | |
| 6,613,236 B1 | 9/2003 | Guess et al. | |
| 2001/0052896 A1 | 12/2001 | Yun | |
| 2006/0060512 A1* | 3/2006 | Astle et al. ...................... 210/85 |

FOREIGN PATENT DOCUMENTS

| | | |
|---|---|---|
| EP | 1 030 143 | 8/2000 |
| WO | WO 01/23819 | 4/2001 |
| WO | WO 01/94893 | 12/2001 |
| WO | WO 2004/092664 | 10/2004 |
| WO | WO 2005/045335 | 5/2005 |

OTHER PUBLICATIONS

International Search Report PCT/EP2006/067431.

* cited by examiner

*Primary Examiner* — Frantz Jules
*Assistant Examiner* — Michael Engrav
(74) *Attorney, Agent, or Firm* — James E. Howard; Andre Pallapies

(57) ABSTRACT

A refrigerator comprising a water conduit that is equipped with a socket for an exchangeable water filter and a monitoring unit for detecting the water throughput through the water conduit, said unit generating an alarm if the water throughput exceeds a threshold value. The monitoring unit can be deactivated if a water filter is mounted in the socket.

5 Claims, 1 Drawing Sheet

REFRIGERATION DEVICE COMPRISING A WATER FILTER

BACKGROUND OF THE INVENTION

The present invention relates to a refrigeration device having a water supply line, a replaceable water filter installed in the water supply line, and a sensor for interaction with the water filter.

A refrigeration device of this type is known from U.S. Pat. No. 6,355,177 B2. In this known refrigeration device, sensors in the form of two switches are arranged at a mounting location of the water filter, only one of said switches being actuated if a water filter is actually installed in the water supply line; the second of said switches being actuated if the water filter is installed or, if instead of the water filter a plug closes the water supply line, and none of said switches being actuated if neither filter nor plug is installed.

Moreover, means are provided in order to monitor the quantity of water that has flowed through the water filter by measuring the opening time period of a valve in the water supply line, and to generate a warning signal for a user if this quantity of water reaches the specified capacity of the water filter. The signal of one of the two switches is evaluated in order to reset a recorded counted measurand of the quantity of water if the filter has been replaced.

A refrigeration device with built-in water filter and a device for comparing a recorded quantity of water that has flowed through the filter, with a limiting value, and for generating a warning signal when the limiting value is reached, is known from U.S. Pat. No. 6,613,236 B1. The limiting value can be selected according to the type of filter used in the refrigeration device.

BRIEF SUMMARY OF THE INVENTION

The object of the invention is to improve the flexibility of the application of conventional refrigeration devices having replaceable water filters.

The object is achieved in that, in a refrigeration device having a water supply line, a holder for a replaceable water filter installed in the water supply line and a monitoring device for recording the water throughput through the water supply line and generation of a warning signal if the water throughput exceeds a limiting value, the monitoring device can then be deactivated if a water filter is mounted in the holder. Consequently, in order to filter out solid particles from the water flow, which could for example impair the functionality of downstream valves, a user is given the option of also fitting a particle filter in the holder, for example, instead of an adsorption filter having a limited service life. The service life of such a particle filter is of a similar order of magnitude as the refrigeration device itself, so that monitoring is neither necessary nor practical.

According to a first embodiment, the monitoring unit of the refrigeration device can have input means which allow deactivation and/or activation by a user input.

According to a more advanced embodiment, the monitoring unit is connected to a sensor for detecting the type of filter mounted in the holder and can be activated or not activated dependent upon the type of filter detected by the sensor. This means that if the detected filter type is an adsorption filter, provision can be made for this to initiate automatic activation of the monitoring unit, whereas on detection of a particle filter the monitoring unit is automatically inactive. Variants are conceivable in which the detection of a particle filter automatically leads to inactivation of the monitoring unit but on detection of another filter type the user is given the opportunity to select between activation and non-activation of the monitoring unit. It is thus left to the user's discretion whether he/she wants monitoring if an adsorption filter is installed. It is further conceivable to provide automatic activation of the monitoring unit on detection of an adsorption filter, whereas on detection of another filter type it is left to the user's discretion whether or not monitoring is required. In particular, this gives the user the option of using filter types which were not available from the manufacturer of the refrigeration device at the time of manufacture, and for which it is not possible to know in advance whether or not their monitoring is meaningful.

In order to reliably distinguish between different filter types by means of a sensor, a different coding with which the sensor interacts, can be provided on a filter housing according to type.

BRIEF DESCRIPTION OF THE DRAWINGS

Further features and advantages of the invention are revealed in the description of exemplary embodiments with reference to the attached figures. These show.

DETAILED DESCRIPTION OF THE PRESENT INVENTION

Figure 1:
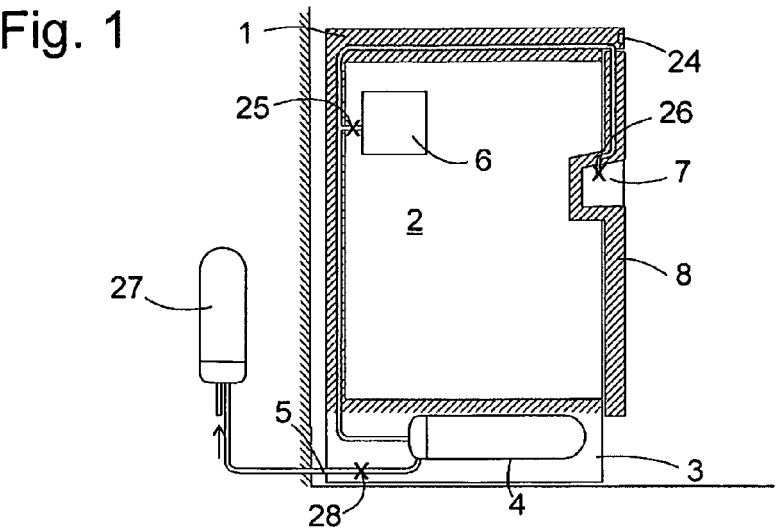
FIG. 1 a schematic section through a refrigeration device according to the invention.

The refrigeration device shown schematically in FIG. 1 has, in a manner known per se, a body 1 with a thermally-insulated internal space 2 and a base area 3 beneath the internal space 2 in which a replaceable water filter 4 is located. The base area 3 contains further components, such as a compressor and a condenser, for instance, which since they are known per se are not illustrated.

The water filter 4 is connected to the domestic water system of a building via a supply line 5 and via a valve 25, supplies an automatic ice maker 6 located in the internal space 2, as well as a dispenser 7 for chilled drinking water which is located in a recess of the door 8. The valve 25 is automatically connected to the supply by an electronic control unit (not shown) if the ice maker 6 signals a demand for water. A valve 26 of the drinking water dispenser 7 can be actuated by placing a receptacle in the recess.

A further valve 28 is positioned in the supply line 5 upstream of the water filter 4. Said valve is always opened and closed by the electronic control unit in synchronism with the valve 25 or 26, respectively.

If the domestic water system contains large amounts of chlorine or for another reason tastes unpleasant, then usefully an adsorption filter, in particular an active carbon filter which binds the flavoring substances is used as the water filter 4. The electronic control unit is arranged to monitor the cumulative water throughput of the filter 4, for example by measuring the cumulative or possibly the weighted opening time period of the valves 25, 26, and to output a warning signal on a display, for example an illuminated display 24, on the front face of the refrigeration device if the cumulative water throughput exceeds a limiting value. When a first limiting value is exceeded a warning signal can thus be generated, which advises a user of the imminent exhaustion of the filter 4 and the need to obtain a replacement, and after a second limiting value is exceeded a warning signal is generated which indicates that the filter 4 must be replaced and that adequate filter action is no longer guaranteed.

If the quality of the domestic water is so good that no adsorption filtering is necessary, or if an adsorption filter 27 is already connected in the domestic water system upstream of the refrigeration device, as shown in FIG. 1, a filter of this type is not required in the water supply line 5 of the refrigeration device itself. In such a case, instead of leaving the mounting location of the water filter 4 in the refrigeration device unoccupied, it is proposed to fit a particle filter at this position. This protects the susceptible valves 25, 26 from water-borne particles such as lime, sand or fragments of the filter material of the upstream filter 27. This considerably reduces the risk of the valves 25, 26 becoming leaky due to particles being lodged therein and water escaping in an uncontrolled manner at the ice maker 6 or the dispenser 7. In particular this enables simple valves having a single closeable passage to be provided as the valves 25, 26, whereas conventional dual valves with two closeable passages arranged in series are otherwise employed as protection against leakiness.

Figure 2:
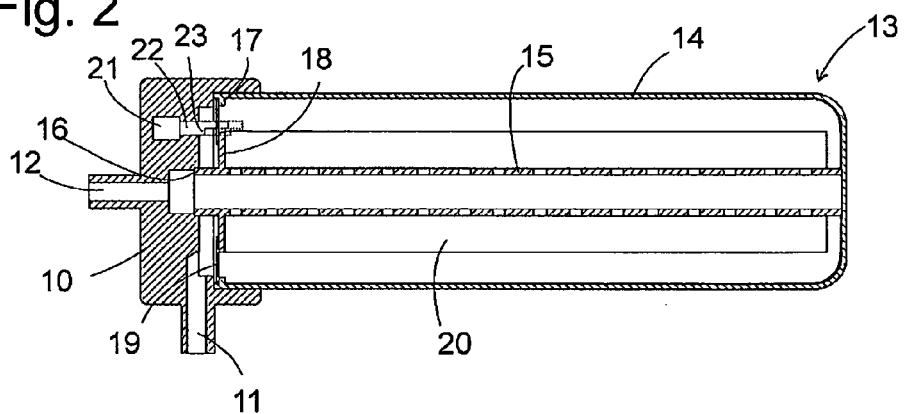
FIG. 2 a section through a filter holder and a water filter attached thereto, according to a first embodiment.

FIG. 2 shows a section through the water filter 4 and its retainer in the base area 3 according to a first embodiment. The retainer has a screw or bayonet holder 10 with a radially oriented inlet connection 11 and an axially oriented outlet connection 12. A filter cartridge 13 which is screwed or locked into the holder 10, has a flask-shaped housing 14 which, adjacent to its open end, is provided with an external thread or bayonet lugs operating together with the holder 10. A tube 15 having multiple perforations, the downstream end 16 of which tightly abuts and encloses the outlet connection 12 at the holder 10, extends along the longitudinal axis of the flask.

The tube 15 and the housing 14 are provided with continuous ribs 17, 18 facing each other, between which is stretched an annular diaphragm 19. In the brand-new condition the diaphragm seals the inlet side of the filter.

A hollow cylindrical filter element 20 encloses the tube 15 inside the housing 14. The filter element 20 essentially consists of an adsorbing material such as active carbon, for instance, whose adsorption capacity is exhausted after the passage of a certain quantity of water through the filter.

A switch 21 which can be actuated by a slider 22 is mounted in the holder 10. In the configuration shown in FIG. 2, the slider 22 presses with its stepped tip against the diaphragm 19. If one of the valves 25, 26 is opened, the pressure of the domestic water system is applied to the diaphragm and this is torn open. This allows the slider 22 to move forward into a second position in which a shoulder 23 of the slider 22 comes to rest on the rib 18 of the tube 15. A third position in which the slider 22 is pushed even further forward is only reached if the filter cartridge 13 is removed.

All three positions of the switch 22 can be detected by the electronic control unit of the refrigeration device. The control unit is connected to the supply line 5 via a water meter, not shown, in order to record the quantity of water that has flowed through the supply line 5 or the filter 4. If the electronic control determines that the slider 22 is in its first position, then it recognizes that a fresh filter has been fitted and it sets the counted measurand for the water that has flowed through the supply line 5 to zero. If the slider is in the second position, the counted measurand is incremented according to the quantity of water that has flowed through the supply line 5. As soon as the counted measurand has reached the first limiting value specified for the relevant type of water filter, the electronic control signals to a user via the display 24 that the water filter 4 is more or less worn out and a replacement must be obtained. When a second, higher limiting value is exceeded, said electronic control signals to the user that it is necessary to replace the filter 4. The switch 21 reaches its first position, the counted measurand is reset and the warning signal at the display 24 disappears only when the worn-out filter is replaced by a new one with an intact diaphragm 19.

If the switch 21 takes up its third position, this could then mean that instead of the filter cartridge 13, an empty housing is installed in the holder 10. In particular, this will be the case if the user does not need a water filter in the refrigeration device, unless, as explained above, the quality of the available domestic water is adequate or filtering of the domestic water has already taken place at another point before reaching the refrigeration device. In this case the control circuit reacts to the detection of the third position by not metering the water flow through the supply line 5 or at least no warning signal is derived from an existing counted measurand and displayed.

An alternate, useful use of the third position of the switch 21 is where the electronic control blocks the opening of a valve 28 located in the supply line 5 upstream of the water filter 4 as long as the switch 21 is in the third position, since said switch can only take up the third position when the holder 10 is unoccupied. In this case the opening of the valve 28 would cause the water to be discharged.

Figure 3:
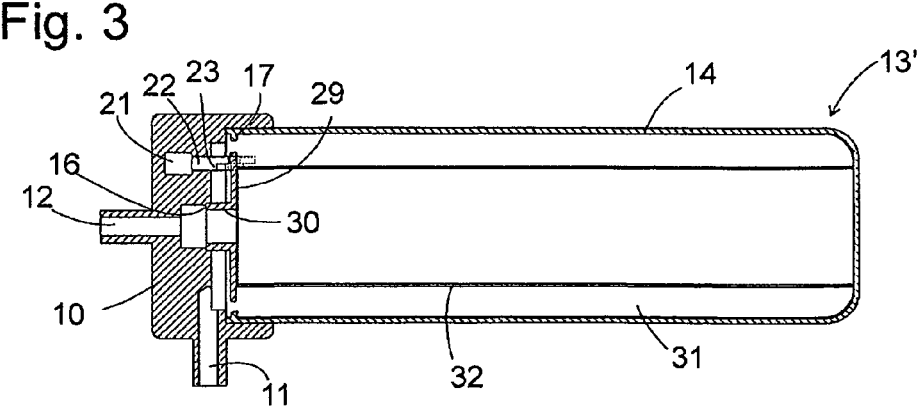
FIG. 3 a section through the filter holder and a water filter attached thereto, with the compatible type shown in FIG. 2.

Furthermore, blocking of the water metering or generation of a warning signal at the display 24 can be achieved by making a filter cartridge 13' available to the user as an accessory component, fitted to the holder 10 as shown in the sectional drawing in FIG. 3.

The filter cartridge 13' has a housing 14 which in external appearance is identical to the housing 14 of FIG. 2, so that both types of filter cartridge can be fitted into the holder 10 at the user's discretion. A cylindrical, porous membrane 32, for example a metal sheet with a plurality of fine holes and bent into a cylinder, is retained between the end face of the housing 14 and a flange 29, from which projects a pipe connection 30 tightly fitted at 16 to the outlet connection 12. The membrane 32 forms a particle filter which retains particles carried in the domestic water in a space 31 between the housing 14 and the membrane 32. The flange 29 is positioned so that if the filter cartridge 13' is correctly installed, said flange holds the slider 22 in its first position. The electronic control therefore always assesses the filter cartridge 13' as new and metering of the water throughput through the supply line 5 is inhibited.

If the user has fitted the adsorption filter cartridge 13, he/she therefore automatically receives a warning signal via the display 24 if the filter is exhausted or nearly so; in the case where the filter cartridge 13' is fitted, such a warning signal remains off without the user having to make any changes to the operating settings of the device.

The membrane 32 of the filter of FIG. 3 can be replaced by a porous filter element made of a chemically inert material, for example ceramic. With suitably-sized pores, such a filter element is able to store a considerable quantity of water-borne particles in its interior without seriously impairing the water permeability. Like the membrane 32, the filter element can be retained between the flange 29 and the front face of the housing 14, and it can have a central bore projecting from the flange 29, which preferably does not extend right up to the front face of the housing.

Of course it is no problem for the person skilled in the art to replace the switch 21 entirely or partially by user-operated switches. For example, the switch 21 can have just two positions, one of which it occupies when the filter cartridge 13 or 13' is installed, and the other position when said filter cartridge is absent. In such a case, the switch is merely used to control the opening and closing of the valve 28 connected upstream of the filter 4; one setting which the control unit specifies is whether the installed filter is an adsorption filter or a particle filter. This then has to be carried out manually by the user at an operator control element provided for this purpose.

Another possible variant is that the switch 21 is merely able to differentiate between, on the one hand, a housing equipped with filter material and on the other hand an empty housing. In the case where an empty housing is detected, the monitoring of the water consumption can be automatically inhibited, whereas if a filter is present, the user can be given the option via an appropriate switch of specifying whether the filter is an adsorption filter (in which case monitoring of the service life takes place), or whether it is a particle filter (in which case monitoring does not occur).

The invention claimed is:

1. A refrigeration device comprising:
a water supply line, a replaceable water filter adapted to be installed in the water supply line, a holder for the replaceable filter; a monitoring device for recording the water throughput through the water supply line and for generating a warning signal if the water throughput exceeds a limiting value; and an apparatus for deactivating the monitoring unit if the water filter is fitted in the holder; a sensor; the monitoring unit being connected to the sensor for detecting the type of filter fitted in the holder whereby the monitoring unit may be activated or not activated dependent upon the type of filter detected by the sensor, wherein upon at least one of detection of a first type of filter the monitoring unit is automatically active and detection of a second type of filter the monitoring unit is automatically inactive; wherein the first type of filter is an adsorption filter and the second type of filter is a particle filter.

2. The refrigeration device as claimed in claim 1, wherein the monitoring unit includes an input for allowing at least one of deactivation of the monitoring unit and activation of the monitoring unit by a user.

3. The refrigeration device as claimed in claim 1, wherein the sensor interacts with a different coding of the filter according to the type of filter.

4. The refrigeration device of claim 1, wherein the monitoring unit includes an input for allowing deactivation of the monitoring unit and activation of the monitoring unit by a user.

5. The refrigeration device as claimed in claim 1, wherein upon detection of a first type of filter, the monitoring unit is automatically active and upon detection of a second type of filter, the monitoring unit is automatically inactive.

* * * * *